United States Patent [19]
Zachariades et al.

[11] 3,933,935
[45] Jan. 20, 1976

[54] FLEXIBLE VINYL ESTER RESIN COMPOSITIONS

[75] Inventors: George Zachariades, Alvin; Rhetta Q. Davis, Clute, both of Tex.

[73] Assignee: The Dow Chemical Company, Midland, Mich.

[22] Filed: Aug. 8, 1974

[21] Appl. No.: 495,710

[52] U.S. Cl. .......... 260/836; 117/93.31; 204/159.11; 204/159.15; 204/159.16; 260/37 EP; 260/42.28; 260/78.5 R; 260/78.5 UA; 260/837 R
[51] Int. Cl.² .......................................... C08L 63/00
[58] Field of Search ........................... 260/836, 837

[56] References Cited
UNITED STATES PATENTS

| | | | |
|---|---|---|---|
| 3,367,992 | 2/1968 | Bearden | 260/836 |
| 3,632,861 | 1/1972 | Hargis | 260/836 |
| 3,720,592 | 3/1973 | Mani | 260/836 |
| 3,810,825 | 5/1974 | Mani | 260/836 |
| 3,810,826 | 5/1974 | Mani | 260/836 |

*Primary Examiner*—Paul Lieberman
*Attorney, Agent, or Firm*—H. Lyle Aamoth; Albin R. Lindstrom

[57] ABSTRACT

Thermosettable vinyl ester resins which provide improved flexibility and abrasion resistance are prepared by reacting a polyepoxide with a dicarboxylic acid half ester of a monomer having the formula

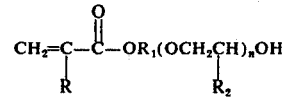

where R is H or methyl, $R_1$ is a two to four carbon alkylene group, $R_2$ is H, methyl or ethyl and $n$ has an average value of 3 to 6.

8 Claims, No Drawings

FLEXIBLE VINYL ESTER RESIN COMPOSITIONS

BACKGROUND

Terminally unsaturated vinyl ester resins prepared by reacting a polyepoxide with a dicarboxylic acid half ester of a hydroxyalkyl acrylate or methacrylate are disclosed in U.S. Pat. No. 3,367,992. While these resins have many useful properties, their use in applications which require flexibility in the thermoset resin is limited. Those applications where flexibility is important include coatings, binders and adhesives.

SUMMARY OF THE INVENTION

Accordingly this invention is an improvement over the previously described resins in that coatings, binders and adhesives with greatly improved flexibility or elongation may be obtained. In addition, coatings prepared from the resins of this invention provide additional advantages in abrasion resistance and resistance to yellowing under exposure to ultraviolet light.

The resins are prepared by reacting a polyepoxide with a dicarboxylic acid half ester of a hydroxyl containing vinyl monomer of the formula

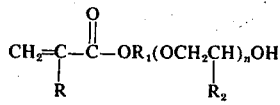

where R is H or methyl, $R_1$ is an alkylene group of two to four carbons, $R_2$ is H, methyl or ethyl and $n$ has an average value of 3 to 6.

DESCRIPTION

The hydroxy containing vinyl monomer employed in this invention is essential to the attainment of flexibility in coatings, adhesives and the like. Monomers of the formula above are conveniently prepared by reacting an alkylene oxide such as ethylene oxide, propylene oxide or butylene oxide with a hydroxyalkyl acrylate or methacrylate. Typical of the latter are hydroxyethyl, hydroxypropyl and hydroxybutyl acrylate or methacrylate. The reaction is normally catalyzed by a Lewis acid such as $BF_3$ and the like.

The reaction of an alkylene oxide with hydroxyl containing compounds is well known, e.g. see chapter 2 on the mechanism of ethylene oxide condensation in "Nonionic Surfactants" edited by M. J. Schick as well as pages 92–100 in chapter 4. The general procedure used to prepare th monomers described by the above formula consisted of placing a hydroxyalkyl acrylate or methacrylate (e.g. hydroxyethyl acrylate) in a clean, dry, nitrogen flushed kettle along with an inhibitor such as the methyl ether of hydroquinone and 0.5% of $BF_3$-etherate as a catalyst. Three to six moles of an alkylene oxide per mole of hydroxyalkyl acrylate was then fed to the kettle at room temperature allowing the exotherm to raise the temperature to 50°–55°C. Cooling was used to maintain the reaction in this temperature range. After completion of the reaction the contents were allowed to digest for 1 hour. A vacuum was then applied to remove traces of unreacted oxide and other volatiles. The $BF_3$-etherate was neutralized with a small amount of triethanol amine. After cooling 1% acrylic acid was added as a stabilizer.

The monomers obtained have a molecular weight distribution directly proportional to the amount of alkylene oxide employed, i.e., to the mole ratio of oxide to hydroxyalkyl acrylate or methacrylate. The reaction product will be a monomer mixture of various mole ratio oxide adducts. Such monomer mixtures may be used here, as is, provided that the monomers have an average mole ratio adduct of oxide to hydroxyalkyl acrylate or methacrylate of 3:1 to 6:1. Lower mole ratios do not provide sufficient improvement in flexibility and higher mole ratios result in poor properties. The value for n in the formula indicates the above average mole ratio.

Monomers having the above formula are reacted with a dicarboxylic acid to form the half ester. Conveniently the acid anhydride, when available, is used to prepared the half ester. Suitable examples of the latter include unsaturated cyclic anhydrides such as maleic, citraconic, itaconic and like anhydrides as well as saturated anhydrides such as phthalic, succinic, dodecenyl succinic and like anhydrides. The diacids, themselves, may be used employing known esterification procedures.

The preparation of the vinyl ester resins by reaction of the half esters with a polyepoxide is disclosed in U.S. Pat. No. 3,367,992, which is hereby incorporated by reference. The cited patent discloses conditions for the resin reaction as well as suitable polyepoxides.

Briefly the polyepoxide and half ester are reacted in about stoichiometric amounts (i.e., about one epoxide group per each carboxylic acid group) generally with heating. Vinyl polymerization inhibitors are usually added along with a catalyst for the epoxide-carboxylic acid reaction such as trivalent chromium salts or a tertiary amine such as tris(N,N-dimethyl aminomethyl) phenol (DMP-30).

A variety of polyepoxides having more than one epoxide group per molecule are disclosed in U.S. Pat. No. 3,367,992 and may be used herein. More preferred are the polyglycidyl ethers of polyhydric phenol based polyepoxides such as those based on bisphenol A. Also included are the epoxy novolac resins. Other usable polyepoxides include aliphatic and halogenated polyepoxides. Further details can be found in said patent.

The novel flexible resins of this invention are thermosettable. Free radical yielding catalysts such as peroxides, azo catalysts and persulfates may be and usually are added to increase the rate of polymerization (cure). Alternately the resins are polymerizable by exposure to ionizing radiation or to ultraviolet light. In the latter instance photoinitiators are usually added to increase the rate of cure. A large variety of photoinitiators are well known and readily available.

While the resin may be cured, as is, it is usually combined with a copolymerizable vinyl monomer in order to alter the viscosity of the resin, to vary the properties of the cured coating, etc. Most any vinyl monomer may be employed which is copolymerizable with the unsaturated groups of the resin (principally acrylate and methacrylate groups).

Such monomers include both monovinyl and polyvinyl monomers. Typical monomers include the alkenyl aromatic monomers such as styrene, vinyl toluene, t-butyl styrene and the like; and alkyl and hydroxyalkyl esters of acrylic and methacrylic acid such as methyl, ethyl, propyl, butyl, cyclohexyl and hydroxyethyl, hydroxypropyl and hydroxybutyl acrylates and methacrylates. In addition to the above, other monomers especially useful for ultraviolet light curable systems such as 2-acetoxyalkyl acrylates, pentaerythritol di-, tri or tetra acrylate and the like may be used.

The monomer and resin may be combined in any proportion which provides a compatible mixture. Preferably the resin comprises about 25 to 75 weight percent and more preferable about 40 to 60 weight percent of the mixture with the balance to make 100 percent of the monomer.

The following non-limiting examples will further illustrate the invention.

The mixture was then cooled to 100°C and 200 grams of a polyglycidyl ether of bisphenol A having an epoxide equivalent weight (EEW) of 190 (D.E.R. 331) was added along with 0.4 gram of DMP-30 catalyst. The mixture was slowly heated to 115°C. and reacted for four hours until the residual acid and epoxy value was less than about 0.6%. The resin may then be diluted with a copolymerizable monomer and cooled. The resin can be illustrated by the following formula:

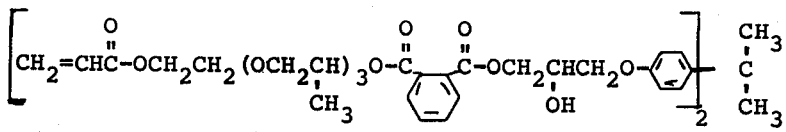

EXAMPLE 1

A series of oxyalkylated monomers was prepared by reacting propylene oxide (PO) in varying mole ratios with hydroxyethyl acrylate (HEA). The average experimental molecular weights were determined by gel permeation curve analysis with the results below.

| No. of moles of PO/mole of HEA | Exptl. Avg. Mol. Wt. | Theor. Mol. Wt. |
|---|---|---|
| 0 | 116 | 116 |
| 1 | 165–175 | 174 |
| 3 | 275–300 | 290 |
| 6 | 420–520 | 464 |

EXAMPLE 2

The preparation of flexible vinyl ester resins according to this invention is illustrated as follows. A three necked 500 ml flask equipped with a stirrer was charged with 148 grams (1 mole) of phthalic anhydride and 300 grams (1 mole) of an acrylate monomer which was a reaction product of HEA and three mole of propylene oxide. To the mixture was added 0.1 gram of hydroquinone inhibitor. The mixture was heated slowly to 118°C. and reacted for about 6 hours. The half ester produced can be illustrated by the following formula.

EXAMPLE 3

By the procedure of example 2 a vinyl ester resin was prepared using an acrylate monomer which was a reaction product of HEA and 1 mole of propylene oxide having an average molecular weight of 174.

EXAMPLE 4

By the procedure of example 2 a vinyl ester resin was prepared from hydroxyethyl acrylate (HEA) corresponding to the teaching of U.S. Pat. No. 3,367,992.

EXAMPLE 5

By the procedure of example 2 a vinyl ester resin was prepared using an acrylate monomer which was a reaction product of HEA and 6 moles of propylene oxide having an average molecular weight of 510.

EXAMPLE 6

An acrylate monomer was prepared as in example 1 by reacting 3 moles of ethylene oxide with HEA. This monomer having an average molecular weight of 272 was used to prepare a vinyl ester resin according to the procedure of example 2.

EXAMPLE 7

The vinyl ester resins previously prepared were diluted with 45 weight percent hydroxypropyl acrylate (HPA) and cured with 1% benzoyl peroxide for 16 hours at 80°C. and for 45 minutes at 125°C. Physical properties were determined as follows. In all instances the resin cured to a tack-free state.

| | Viscosity at Room Temp. | | | |
|---|---|---|---|---|
| Base Resin | 45% HPA | Av. no. of moles of PO per mole of HEA | Tensile Strength | % Elongation at Failure |
| semi-solid | 1,100 cps | 0 | 8000 psi | 9 |
| semi-solid | 1,250 cps | 1 | 7000 psi | 10 |
| 600,000 cp | 500 cps | 3 | 2500 psi | 110 |
| 35,000 cp | 700 cps* | 6 | rubbery | rubbery |

*Resin diluted to 25% HPA

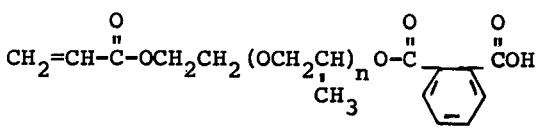

(n= an average of 3 moles of propylene oxide)

The improvement in elongation when the average number of moles of alkylene oxide reacted with the hydroxyalkyl acrylate reaches 3:1 is evident. Further comparative evidence showing little or no flexibility can be found in examples 8–12 of U.S. Pat. No. 3,367,992 where the elongation varied from 3.2 to 8.0%. In the examples hydroxypropyl and hydroxyethyl acrylate were used to make the half esters which were in turn reacted with a polyepoxide to produce the resin.

EXAMPLE 8

The curability of the vinyl ester resins of this invention by exposure to ultraviolet light is shown in the following tests. The resin of example 2 (3 PO/HEA) and example 6 (3 EO/HEA) were each diluted with 45% acetoxypropyl acrylate, coated on Bonderite 37 steel panels and cured by exposure to U.V. light. In each case 2% of n-butyl benzoin ether (Trigonal 14) was added as a photoinitiator. The coated steel panel was passed at a speed of 100 ft/min under a 200 watt lamp and the number of passes required to cure to a tack-free state was determined. The results are shown below.

| Resin | No. of passes to cure | Pencil Hardness | MEK Resistance | Taped Adhesion |
|---|---|---|---|---|
| Ex. 2 | 8 | HB | Pass 20 | Excellent |
| Ex. 6 | 5 | H | Pass 20 | Excellent |

In a similar manner the resin of example 5 (6 PO/HEA) and a comparable resin prepared with ethylene oxide instead of propylene oxide (6 EO/HEA) were cured by exposure to U.V. light. In each case no copolymerizable monomer was employed.

| Resin | No. of passes to cure | MEK Resistance |
|---|---|---|
| 6 PO/HEA | 8 | Pass 30 |
| 6 EO/HEA | 4 | Pass 45 |

The above results show that the resins, per se, are curable and do not require the presence of a copolymerizable monomer.

EXAMPLE 9

A vinyl ester resin prepared as in example 2 was diluted with 45% by weight acetoxypropyl acrylate monomer. The resin was coated to a 1 mil thickness on a flexible vinyl web. An electrostatic gun applicator was used to apply fabric flocking material to the coated side of the web which was then irradiated with 6 megarads of ionizing ratiation to cure the resin and anchor the flocked material to the web. The fabric produced exhibited a soft, velvety hand and good adhesion.

EXAMPLE 10

Using a resin similar to that of example 9 tests were made on gloss retention when coated on vinyl floor tile. For comparison tests were made with a resin made by reacting 2 moles of acrylic acid with a diglycidyl ether of bisphenol A. Each resin (45% monomer) was coated to a thickness of about 2 mils and cured by exposure to U. V. light (2% T-14 photoinitiator added). The cured tiles were then measured for gloss retention after various cycles of scrubbing.

A Gardner Heavy Duty Wear Tester is used to wet-abrade the sample with a reciprocating, rectilinear motion. The abradant is normally a prewet nylon brush used with an abrasive powder along the abrasion path. Specifically, an attached disperser releases 0.75–1.0 g blue and white Ajax/50 cycles and 1 drop $H_2O$/cycle.

Gloss retention is measured against a gloss standard of highly polished opaque black glass after calibration of the glossmeter with standards of lower gloss. The specimen being tested is always illuminated at the same position to reduce the effect of any nonuniformity of the coating. The "gloss retention" is simply the fraction of incident light reflected from a surface in the mirror direction within a specified angular tolerance.

| No. of Cycles | Scrub Abrasion Resistance, 60° Gloss Retention | |
|---|---|---|
| | Resin of this Invention | Comparative Resin |
| 0 | 86 | 88 |
| 50 | 73 | 59 |
| 100 | 67 | 48 |
| 150 | 65 | 40 |
| 200 | 65 | 26 |

These tests under similar conditions show the resin coatings of this invention provide improved abrasion resistance and gloss retention.

EXAMPLE 11

Similar to example 10 coatings were made on Morest Pentration Opacity Paper and exposed to U.V. light under similar conditions. The degree of yellowness was determined after various cycles of exposure according to ASTM D 1925.

Specimens are exposed to U.V. light for various lengths of time and the change in yellowness is determined. The degree of yellowness is based upon tristimulus values calculated from data obtained from a 400–700 nm scan using the G. E. type recording spectrophotometer. Yellowness index thus obtained correlates reasonably well with the magnitude of yellowness perceived under normal daylight illumination.

The magnitude of yellowness of the untreated specimen is determined relative to either a magnesium oxide layer (ASTM recommended Practice E259) or a calibrated white structural gloss standard. By the test method employed, postive(+) yellowness index describes the presence and magnitude of yellowness and negative (−) yellowness index notes lack of yellowness or presence of blueness. Correspondingly, the same notation holds for the change in yellowness index determined after exposure of the specimen to U.V. light.

| No. of Cycles | Changes in Yellowness Index | | | |
|---|---|---|---|---|
| | Resin of this Invention | | Comparative Resin | |
| | YI | ΔYI | YI | ΔYI |
| 0 | 11.98 | — | 9.44 | — |
| 25 | 14.73 | 2.75 | 19.10 | 9.66 |
| 50 | 21.08 | 9.10 | 29.59 | 20.15 |
| 75 | 21.52 | 9.54 | 28.68 | 19.24 |
| 175 | 23.12 | 11.14 | 35.36 | 25.92 |

Again, improved results are shown by the resins of this invention.

EXAMPLE 12

The flexibility of U.V. cured films was tested with an Erichson bump tester. A resin similar to example 2 was diluted with 45% by weight hydroxypropyl acrylate and 2% of Trigonal 14 was added. The resin was applied as a 0.5–0.6 mil film onto a Bonderite 37 panel and cured by U.V. light. For comparison purposes a resin similar to example 4 was tested in the same manner. The cured film was subjected to a reverse deformation force applied at a constant rate. The value given is the millimeters of deformation required before film failure.

| Resin | Distance, mm |
|-------|--------------|
| Ex. 2 | 6.8–6.9 |
| Ex. 4 | 6.2–6.3 |

Similar results to the previous examples may be obtained by using suitable equivalents for the specific materials employed. For example, phthalic anhydride may be replaced by an equivalent amount of maleic anhydride or succinic anhydride; hydroxyethyl acrylate may be replaced with hydroxypropyl or hydroxybutyl acrylate or methacrylate; the polyglycidyl ether of bisphenol A (D.E.R. 331) may be replace with higher molecular weight polyglycidyl ethers of bisphenol A (high EEW) or by epoxy novolacs; and the monomer used may be replaced by any of the previously mentioned monomers.

What is claimed is;

1. A thermosettable resin composition which comprises the reaction about equivalent proportions of a polyepoxide and a dicarboxylic acid half ester of a monomer having the formula

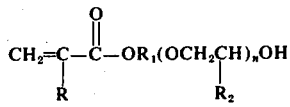

where R is H or methyl, $R_1$ is an alkylene group having two to four carbon atoms, $R_2$ is H, methyl or ethyl and $n$ has an average value of 3 to 6.

2. The composition of claim 1 wherein $R_1$ is —$CH_2CH_2$— and $R_2$ is methyl.

3. The composition of claim 2 wherein n is 3 and R is H.

4. The composition of claim 3 wherein said dicarboxylic acid is phthalic, maleic or succinic acid.

5. The composition of claim 1 where $R_1$ is —$CH_2CH_2$— and $R_2$ is H.

6. The composition of claim 5 wherein n is 3 and R is H.

7. The composition of claim 6 wherein said dicarboxylic acid is phthalic, maleic or succinic acid.

8. The composition of claim 1 further comprising a mixture of said resin with a copolymerizable vinyl monomer.

* * * * *

UNITED STATES PATENT AND TRADEMARK OFFICE
CERTIFICATE OF CORRECTION

PATENT NO. : 3,933,935

DATED : January 20, 1976

INVENTOR(S) : George Zachariades and Rhetta Q. Davis

It is certified that error appears in the above-identified patent and that said Letters Patent are hereby corrected as shown below:

In Col. 7, line 24, after the word "reaction", insert

-- product of --.

Signed and Sealed this twenty-ninth Day of June 1976

[SEAL]

Attest:

RUTH C. MASON
*Attesting Officer*

C. MARSHALL DANN
*Commissioner of Patents and Trademarks*